INVENTORS
JOHN S. NOTCHEV
EDGAR S. MACHACEK
WALDO J. DARRACQ
BY JEAN A. MALTHANER

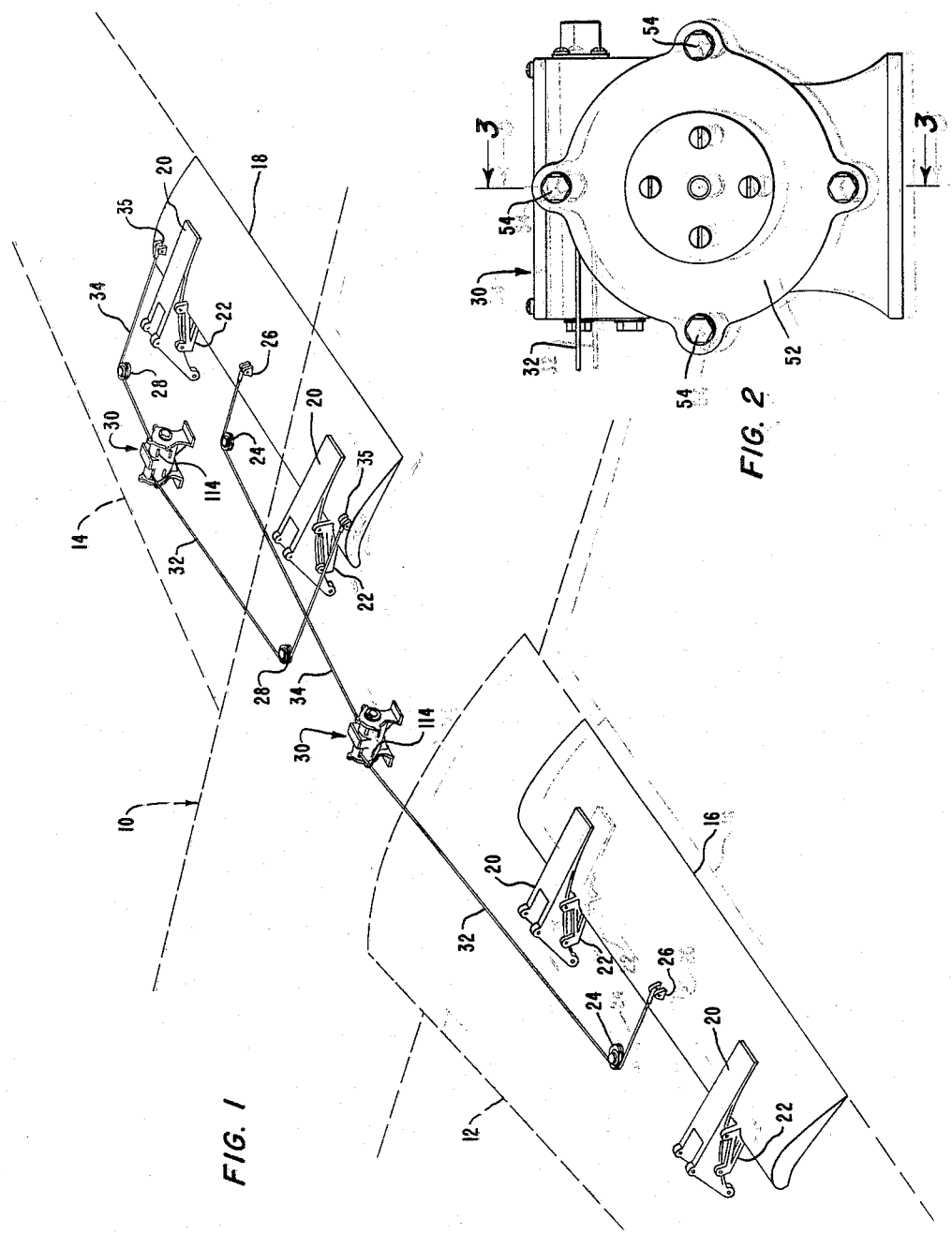

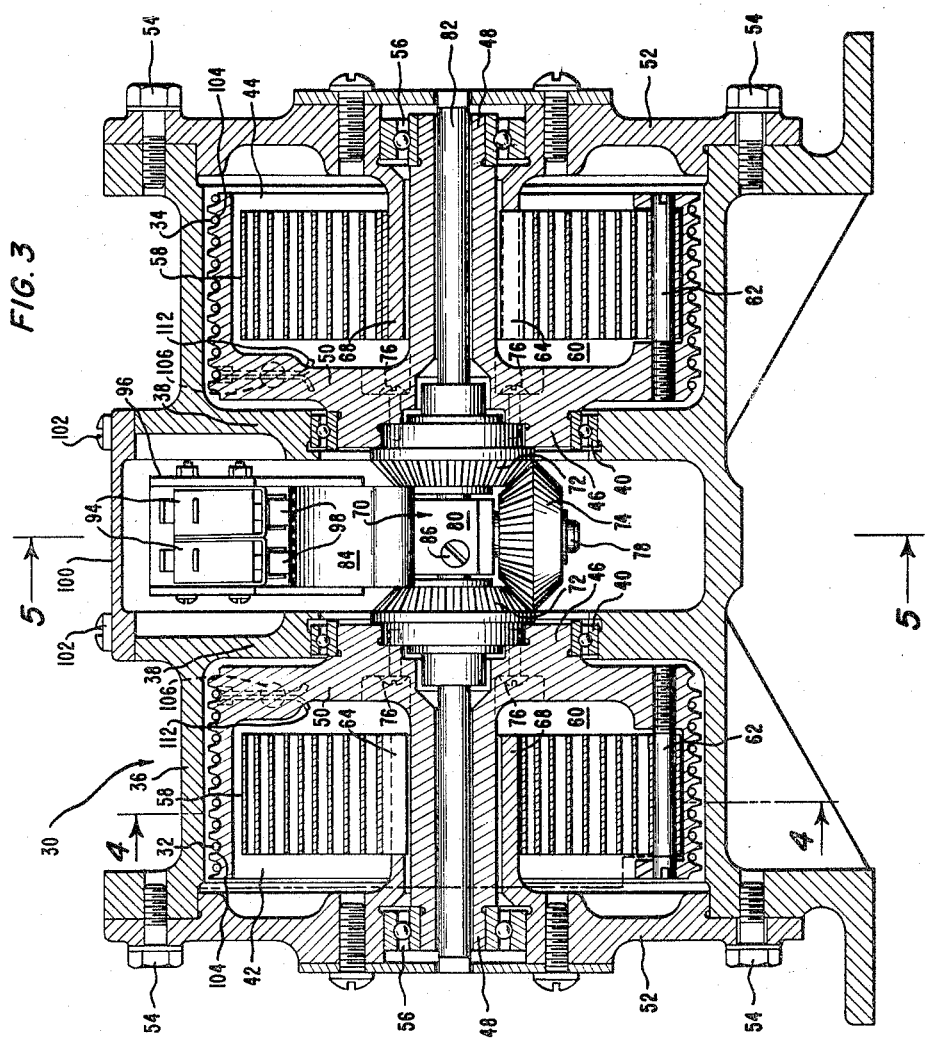

Carl R. Brown
ATTORNEY

United States Patent Office 3,169,178
Patented Feb. 9, 1965

3,169,178
ASYNCHRONOUS MOTION DETECTOR
John S. Notchev, San Diego, Edgar S. Machacek, Del Mar, and Waldo J. Darracq and Jean A. Malthaner, San Diego, Calif., assignors to General Dynamics Corporation, San Diego, Calif., a corporation of Delaware
Filed Jan. 4, 1963, Ser. No. 249,516
5 Claims. (Cl. 200—61.46)

The present invention relates to an asynchronous motion detector and more particularly to a precision device capable of detecting differential motion occurring between the individual components thereof.

The asynchronous motion detector of the present invention although being particularly suited for use on aircraft, further lends itself for use in other fields such as marine and various forms of machinery. For example, in aircraft, the detector may be employed to detect undesirable differential motion occurring between opposite ends of a wing flap during the extension and retraction movement thereof. In the marine field, detection of asynchronous motion arising during the extension or retraction of the individual hydrofoils on boats may prevent listing of the boat hull while the boat is riding on its hydrofoils. Machinery such as cranes employing multiple cables, or overhead traveling cranes having widely spaced trolley wheels may also achieve a benefit from the use of the asynchronous motion detector. These are but a few examples of the many applications to which the asynchronous motion detector may be gainfully applied.

From the foregoing it will be apparent that the instant invention is not to be construed as being restricted to a particular field. However in order to present the details of construction and the operation of this device in sharper focus, the application thereof to aircraft wing flaps has been selected as a typical example of an installation where the asynchronous motion detector may be employed.

The asynchronous motion detector comprises a housing in which a pair of axially spaced cable drums are rotatably journaled. In the illustrated embodiment, a differential gear assembly is positioned intermediate the cable drums and is secured to a shaft which passes through the axis of the cable drums. Each of the cable drums is secured to a bevel gear of the differential assembly. An idler bevel gear engages the cable drum bevel gears at right angles thereto. A cam member is secured to the differential gear assembly opposite the idler gear and intermediate the cable drum bevel gears. A pair of micro switches mounted side-by-side are secured to the housing and are each provided with actuator arms on which cam followers are journaled. These cam followers are biased into engagement with the camming surface of the cam member. The cable drums are recessed to receive spiral-shaped torsion springs within the body thereof. One end of each of the torsion springs secures to its respective cable drum and the opposite ends thereof are anchored to the housing. The springs are fitted to the cable drums and housing in such a manner as to transmit their torque to the cable drums in opposite directions, i.e., one drum is urged to turn in a clockwise direction and the other in a counter clockwise direction. The outer periphery of the cable drums is grooved to receive a cable. These grooves assume a helix form to wind the cables onto the drums without overlapping the individual turns upon one another. Each cable is secured to its respective cable drum through a swaged collar or ball secured to the end of the cable which engages a shoulder within a bore in the cable drum. The cables exit from the housing through suitable openings. In one arrangement, the free ends of the cables pass over sheaves and secure to the inboard and outboard ends of a flap. In another arrangement, the cables pass over sheaves and secure to the central portion of the wing flaps; one cable to the left hand flap, and the other to the right hand flap. In either arrangement, if one cable is caused to be moved at a different velocity than the other (assuming the cable drums to be of equal diameter), the differential gear assembly will be caused to pivot about the axis of the shaft whereby the cam member carried by the differential gear assembly will rotate correspondingly to position a lobe of the cam member into contact with the cam followers of the switches. Each of the switches is normally closed and upon actuation thereof by engagement with the cam member, they are urged into open position to automatically break the circuit in the system of the flap actuators (not shown). A fail-safe feature is achieved through the use of two switches in lieu of a single switch.

An object of the present invention is to provide an asynchronous motion detector capable of detecting relative motion between the individual components thereof.

Another object of this invention is to provide an asynchronous motion detector embodying means to effect a signal upon detecting asynchronous motion of the object to be monitored.

A further object of this invention is to provide an asynchronous motion detector embodying means to shut off the power to the device being monitored upon detection of asynchronous motion thereof.

Yet another object of this invention lies in its ability to deactivate one unit or unit portion while activating another unit or unit portion upon sensing asynchronous motion between the individual units or portions of a unit.

A still further object of this invention lies in the construction of the detector signal and/or circuit disrupting mechanism whereby the amount of asynchronous movement necessary for activation thereof may be varied as desired to accommodate a particular requirement.

Other objects and features of the present invention will be readily apparent to those skilled in the art from the following specification and appended drawings wherein is illustrated a preferred form of the invention, and in which:

FIGURE 1 is a perspective view of a right and left hand wing flap showing the asynchronous motion detector connected to each of these flaps and to the inboard and outboard ends of the right hand flap and further showing a fragmentary portion of an airplane in dash outline.

FIGURE 2 is an end elevational view of the asynchronous motion detector.

FIGURE 3 is an enlarged longitudinal cross sectional view showing parts and portions in elevation, taken on the line 3—3 of FIGURE 2.

Figure 5:
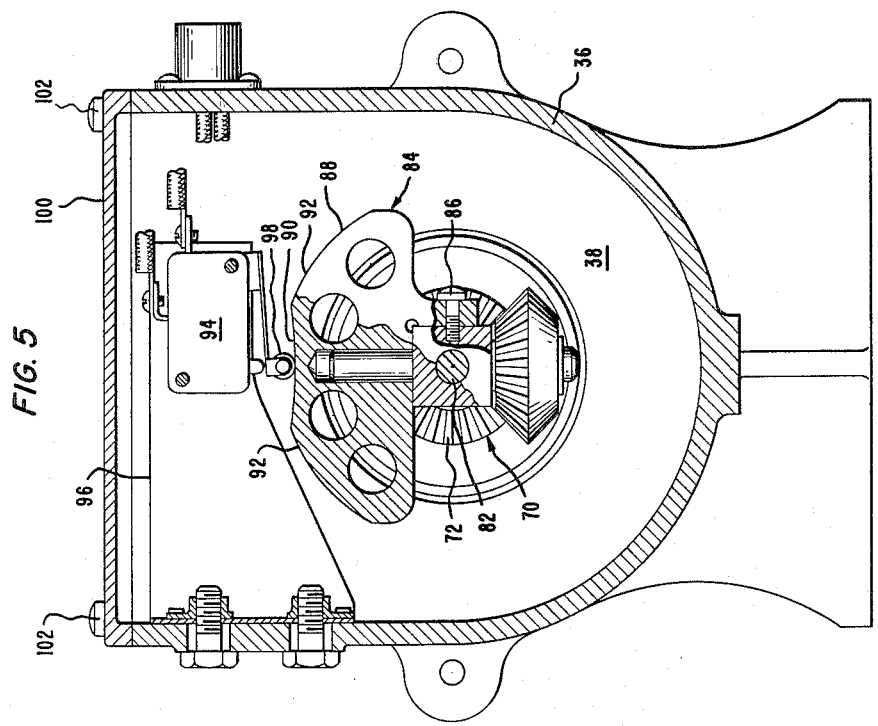
FIGURE 5 is a cross sectional view taken on the line 5—5 of FIGURE 3.
Figure 4:
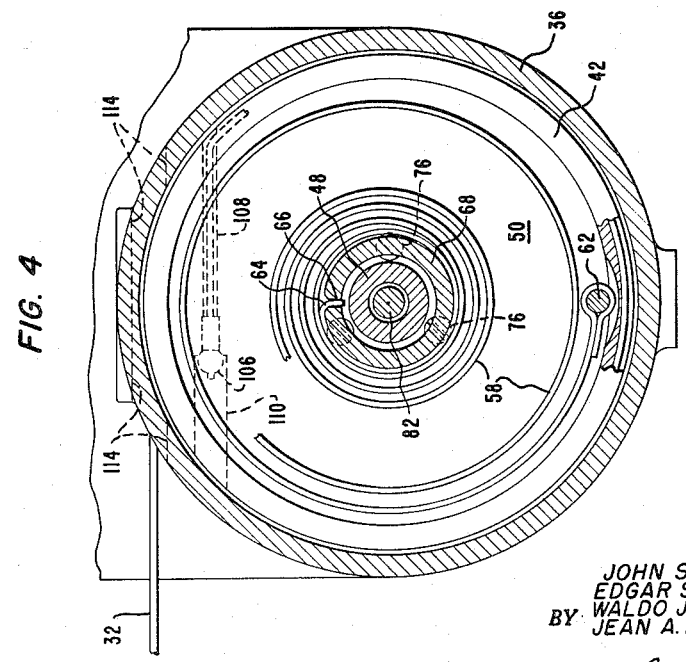
FIGURE 4 is a cross sectional view taken on the line 4—4 of FIGURE 3.

A fragmentary portion of an airplane generally designated by the numeral 10, is shown in FIGURE 1 having a pair of wings 12 and 14 on which are carried the usual left and right hand wing flaps 16 and 18 respectively. These wing flaps are of the type that are mounted on rails or tracks 20 secured to the wing. Roller carriages 22 secured to the leading edge of the flaps, guide the flaps from a retracted position as shown in FIGURE 1, to their extended position. Extension and retraction of the flaps may be achieved through various mechanisms such as screw jacks or mechanical linkages coupled to actuator motors (not shown).

FIGURE 1 illustrates two applications for use of the asynchronous motion detector of the present invention on aircraft. In one application, the asynchronous motion detector generally designated 30 is positioned within the fuselage or body of the airplane 10. Cables 32 and 34 deploying from the asynchronous motion detector 30 pass around sheaves 24 journaled on the wing and secure to fittings 26 which are in turn secured to the individual flaps 16 and 18. In another application, the asynchronous motion detector 30 is shown positioned within the internal structure of the wing 14 where it is intended that it be secured to convenient structure. Cables 32 and 34 deploying from the asynchronous motion detector 30 pass around sheaves 28 journaled on the wing 14 and secure to fittings 35 which in turn are secured to opposite ends of the flap 18.

The asynchronous motion detector 30 comprises a housing or frame 36 which is substantially cylindrical in form. Axially spaced bearing support flanges 38 project radially inward from the cylindrical frame 36 to receive bearings 40. Rotatable elements in the form of cable drums 42 and 44 are revolvably mounted within the frame 36 in spaced relation to each other. Each of the cable drums is provided with a hub member 46 and a reduced diameter hub member 48 projecting outwardly from opposite sides of a closed end 50 thereof. The hubs 46 of the cable drums 42, 44, engage the internal race of the ball bearings 40 for rotatable support in the frame 36. Frame end plates 52 are suitably secured to the open ends of the frame 36 as by bolts 54. Bearings 56 are positioned within a bore of the end plates 52 to rotatably receive and support the hub member 48 at the end opposite the hub end 46 of the cable drums 42, 44. Clock type spirally wound springs 58 are positioned within a cavity 60 of the cable drums 42, 44 The outermost ends thereof are secured to the cable drums 42, 44 by a return loop portion passing around the shank of bolts 62 secured to the cable drums. The opposite innermost ends of springs 58 are provided with right angle flanges 64. These flanges serve to anchor the springs 58 to the asynchronous motion detector 30 by their engagement with slots 66 in the hub portions 68 projecting inwardly from the end plates 52. Hubs 68 are coaxial with, and telescope over, the hubs 48 of the cable drums 42, 44. It is to be noted that in the embodiment disclosed, the springs 58 are installed in the cable drums 42, 44 in a manner such as to create torque in the cable drum 42 in one direction of rotation, and in the cable drum 44 in an opposite direction.

The cable drums 42, 44 are coupled to one another through a transmission assembly generally designated by the numeral 70. The transmission assembly comprises differential gearing in which a pair of oppositely facing bevel gears 72 are engaged with an idler bevel gear 74 disposed at right angles thereto. One gear 72 is secured to the cable drum 42 and the other gear to the cable drum 44 through a plurality of bolts 76 projecting through openings in the closed ends 50 of the cable drums. Idler gear 74 is journaled on a shaft 78 secured to a support element 80. The support element 80 is secured as by a pin or rivet (not shown) to a shaft 82 which passes through and is journaled in suitable bearings in the gears 72. Shaft 82 extends outwardly from the gears 72 to the outer faces of the end plates 52. An actuating means 84 is secured to the support element 80 by a screw 86. The actuating means 84 is provided with a cam surface 88 having a concave portion 90 positioned intermediate spaced lobes 92. A pair of micro-switches 94 arranged side by side are secured to a bracket 96 which is in turn secured to the frame 36. Cam followers 98 rotatably secured to the actuator arms of the microswitches 94 are biased into engagement with the cam surface 88 of the actuating means 84 by their usual springs (not shown). A cover 100 secured to the frame 36 by screws 102 provides access to the transmission assembly 70, actuating means 84 and micro-switches 94. The cables 32 and 34 are wound about the helix grooves 104 of their respective drums 42 and 44. One end of each cable is provided with a ball 106 secured thereto as by swaging. Cable drums 42 and 44 are bored at 108 in a chordwise manner through the closed end 50 thereof to receive the cables 32 and 34 respectively. Enlarged bores 110 communicating with bores 108 receive the cable balls 106 which shoulder against an abutment formed at the juncture of the bores 108 with the enlarged bores 110. Locking means such as cotter pins 112 pass through the bores 110 behind the balls 106 to prevent accidental dislodgement of the balls 106 from within the bores 110 of the drums 42, 44 at such time as prior to rigging when the tension on the springs 58 is relaxed. Cables 32, 34 pass outwardly of the frame 36 through suitable slotted openings 114 for connection to the flap fittings 26 or 35 as hereinbefore described.

In the operation of the asynchronous motion detector, extension and/or retraction of the flap causes rotational movement of the cable drums 42, 44 and their respective gears 72. When the cable drums 42, 44 are rotating in opposite directions at a uniform rate of speed, idler gear 74 in mesh with the gears 72 rotates freely about the axis of the shaft 78. The concave portion 90 of the actuating cam 84 is in contact with the cam follower rollers 98 of the micro-switches 94 during the synchronous rotational movement of the cable drums 42, 44. At such time as a malfunctioning of the flap actuators and/or the roller carriages occurs, one end of the flap may be caused to extend or retract at a different rate of speed than the opposite end. Moreover, one end of the flap may become wedged to the extent that the extension or retraction function may cease entirely. In either case, one gear 72 is caused to rotate at a different rate of speed than the other. This speed differential effects rotational movement of the idler gear 74 about the axis of the shaft 78 concurrently with an orbital movement of the idler gear about the axis of the shaft 82. In so doing, the actuating means 84 carried by the support element 80 of the transmission assembly 70 tilts, thereby actuating the micro-switches 94 by engagement of the lobe portion 92 of the actuating cam 84 with the cam followers 98. The micro-switches 94 are arranged in circuit with the flap actuator whereby the power is automatically cut-off to the actuator in order to prevent serious damage to the flap mechanism. Dual micro-switches 94 are employed as a means to provide a fail-safe system or if desired, to interrupt the flap actuator circuit and concurrently energize a warning signal to alert operating personnel of the malfunctioning of the flap.

While certain preferred embodiments of the invention have been specifically disclosed, it is understood that the invention is not limited thereto as many variations will be readily apparent to those skilled in the art and the invention is to be given its broadest possible interpretation within the terms of the following claim.

We claim:

1. An asynchronous motion detector comprising:
   a frame;
   a transmission means journaled in said frame;
   axially spaced rotatable elements coupled to said transmission means;
   actuating means connected to said transmission means positioned intermediate said rotatable elements;
   said actuating means having a cam surface;
   a switch mounted on said frame operably connected to said cam surface;
   said actuating means being responsive to rotative movement of said rotatable elements; and
   said actuating means being activated upon detection of asynchronous motion occurring between said rotatable elements to actuate said switch and provide a control signal which eliminates the asynchronous motion.

2. An asynchronous motion detector comprising:
   a frame;

a differential transmission means journaled in said frame;
axially spaced cable drums secured to said transmission means;
actuating means connected to said transmission means positioned intermediate said cable drums;
said actuating means having a cam surface;
a switch mounted on said frame in operative connection with said cam surface;
said actuating means being responsive to rotative movement of said cable drums; and
said actuating means being activated upon detection of asynchronous motion occurring between said cable drums to actuate said switch and provide a control signal which eliminates the asynchronous motion.

3. An asynchronous motion detector comprising:
a frame;
a differential mechanism journaled within said frame;
said differential mechanism comprising a first and second bevel gear in mesh with an idler bevel gear;
a first and second cable drum journaled in said frame on a common axis;
said first bevel gear being secured to said first cable drum;
said second bevel gear being secured to said second cable drum;
springs biasing said first and second cable drums in opposite directions of rotation with respect to one another;
said differential mechanism being positioned intermediate said first and second cable drums;
actuating means carried on said differential mechanism;
said actuating means having a cam surface;
a switch mounted on said frame operably engaged with said cam surface;
said actuating means being responsive to differential movements between said first and second cable drums; and
said actuating means being activated upon detection of asynchronous motion occurring between said first and second cable drums.

4. In combination, a device having elements which are moveable along separate paths and wherein it is desired to move such elements in synchronization; and
an asynchronous motion detector including a frame; transmission means journaled in said frame;
axially spaced rotatable members coupled to said transmission means and also coupled one to each of the device elements;
actuating means connected to said transmission means and positioned intermediate said rotatable means;
output means associated with said actuating means for providing an output when asynchronous motion activates said actuating means;
said actuating means being responsive to rotational movement of said rotational members; and
said actuating means being activated upon detection of asynchronous motion between said rotatable elements caused by asynchronous movement of said device elements to produce an output in said output means.

5. In combination, a device having elements which are moveable along separate paths and wherein it is desired to move such elements in synchronization;
and an asynchronous motion detector including a frame;
a differential transmission means journaled in said frame;
axially spaced cable drums secured to said transmission means;
a cable connected to each cable drum and to a device element;
actuating means connected to said transmission means positioned intermediate said cable drums;
said actuating means having a cam surface;
a switch mounted on said frame in operative connection with said cam surface;
said actuating means being responsive to rotational movement of said cable drums;
and said actuating means being activated upon detection of asynchronous motion between the said cable drums, caused by asynchronous motion of said device elements, to activate said switch.

References Cited by the Examiner
UNITED STATES PATENTS

| | | | |
|---|---|---|---|
| 1,377,844 | 5/21 | McCutchen et al. | 74—757 |
| 2,341,273 | 2/44 | Helberg | 74—501.5 |
| 2,445,997 | 7/48 | Brouse | 74—501.5 |
| 2,705,611 | 4/55 | Falkner | 254—172 |
| 2,747,699 | 5/56 | Lucien | 200—61.46 |
| 2,834,843 | 5/58 | Auger | 200—153 |
| 2,900,465 | 8/59 | Weiss | 200—61.46 |

BERNARD A. GILHEANY, *Primary Examiner.*
ROBERT K. SCHAEFER, *Examiner.*